(12) United States Patent
Stenton

(10) Patent No.: US 7,651,237 B2
(45) Date of Patent: Jan. 26, 2010

(54) SYSTEM AND METHOD FOR RETICLE ILLUMINATION

(75) Inventor: Conrad Stenton, Midland (CA)

(73) Assignee: Raytheon Company, Waltham, MA (US)

( * ) Notice: Subject to any disclaimer, the term of this patent is extended or adjusted under 35 U.S.C. 154(b) by 366 days.

(21) Appl. No.: 11/706,814

(22) Filed: Feb. 14, 2007

(65) Prior Publication Data

US 2008/0192245 A1    Aug. 14, 2008

(51) Int. Cl.
*F21G 1/34* (2006.01)
*F21V 7/04* (2006.01)
(52) U.S. Cl. ................... 362/110; 362/551
(58) Field of Classification Search ......... 362/551–582, 362/110, 112, 234–238, 240, 249, 252
See application file for complete search history.

(56) References Cited

U.S. PATENT DOCUMENTS

| 5,907,395 | A  | * | 5/1999  | Schulz et al. | 356/139.03 |
| 5,997,163 | A  | * | 12/1999 | Brown | 362/553 |
| 6,779,931 | B2 | * | 8/2004  | Murata et al. | 385/98 |
| 6,857,769 | B2 | * | 2/2005  | Brun | 362/517 |
| 7,428,796 | B1 | * | 9/2008  | Stenton et al. | 42/123 |

* cited by examiner

*Primary Examiner*—Sandra L O'Shea
*Assistant Examiner*—William J Carter
(74) *Attorney, Agent, or Firm*—H. St. Julian, Esq.

(57) ABSTRACT

A reticle illumination system. The novel system includes a first light source adapted to output light toward a target surface and a material having a predetermined index of refraction disposed between the first light source and the target surface for coupling light from the first light source to the target surface. In an illustrative embodiment, the material is a glue or epoxy having an index of refraction matching that of the target surface, and the target surface is a prism surface upon which a reticle is disposed. The system also includes a second light source adapted to output light into the material such that the light is reflected and scattered off of an exit end of the fiber, and/or off of scattering centers distributed throughout the material, towards the target surface.

17 Claims, 3 Drawing Sheets

SYSTEM AND METHOD FOR RETICLE ILLUMINATION

BACKGROUND OF THE INVENTION

1. Field of the Invention

The present invention relates to optical sights. More specifically, the present invention relates to systems and methods for illuminating a reticle in an optical sight.

2. Description of the Related Art

An optical sight (e.g., a gunsight or scope) is used to accurately aim a device such as a firearm, crossbow, or camera. A conventional optical sight uses a lens system that provides a magnified image of a target for viewing by an observer (the shooter), and typically includes a reticle, which is a pattern (crosshair, circles, dots, etc.) superimposed over the target image that is used by the observer to align the device.

Reticles usually need to be illuminated. Optical sights for military applications often use a radioactive light source, such as tritium, for illuminating the reticle. Tritium light, however, is dim, making it suitable for nighttime operation but not for daytime use. LED light sources can provide brighter illumination of the reticle, but LEDs require a battery that needs to be frequently replaced, and which may fail at an inopportune time. Self-powered light sources that do not require an external power source would be preferable, especially for military applications.

Hence, a need exists in the art for an improved system or method for illuminating a reticle in an optical sight that is suitable for both day and night time operation, which does not require a battery.

SUMMARY OF THE INVENTION

The need in the art is addressed by the reticle illumination system of the present invention. The novel system includes a first light source adapted to output light toward a target surface and a material having a predetermined index of refraction disposed between the first light source and the target surface for coupling light from the first light source to the target surface.

In an illustrative embodiment, the material is a glue or epoxy having an index of refraction matching that of the target surface, and the target surface is a prism surface upon which a reticle is disposed. The system also includes a second light source adapted to output light into the material such that the light is reflected and scattered off of an exit end of the fiber, and/or off of scattering centers distributed throughout the material, towards the target surface.

In an illustrative embodiment the first light source is an optical fiber adapted to receive ambient light and output fluorescent light, and the second light source is a tritium source.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1A:
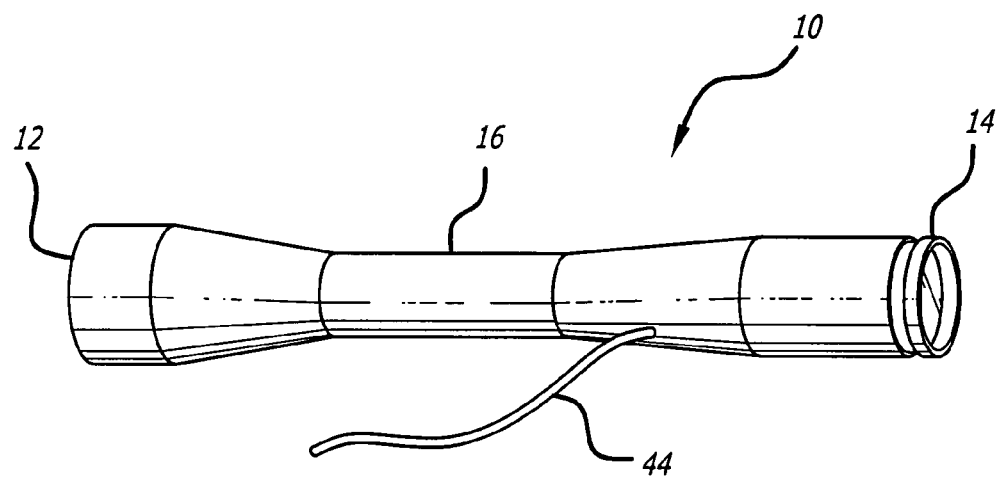
FIG. 1a is an illustration of an optical sight designed in accordance with an illustrative embodiment of the present teachings.
Figure 1B:
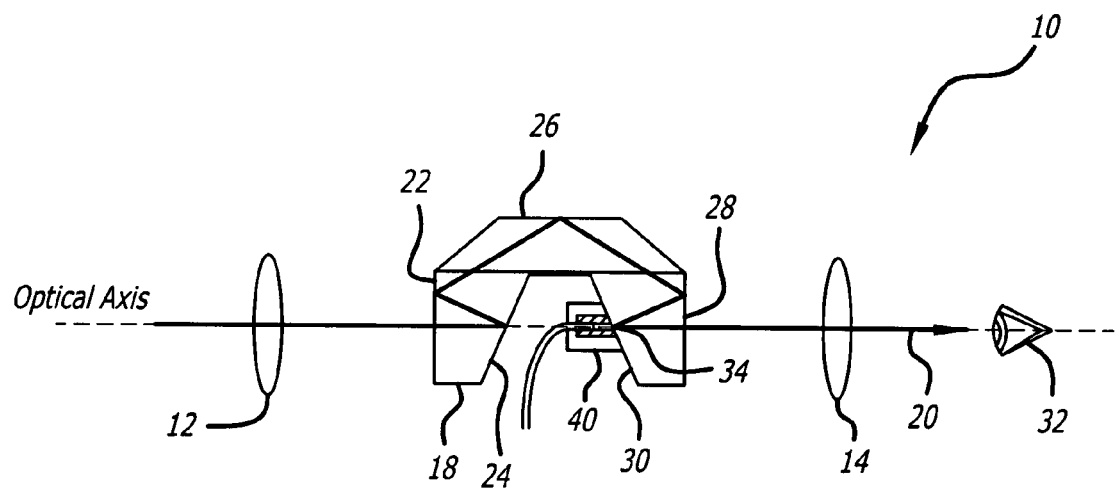
FIG. 1b is a simplified optical schematic of an optical sight designed in accordance with an illustrative embodiment of the present teachings.

FIG. 1a is an illustration of an optical sight 10 designed in accordance with an illustrative embodiment of the present teachings. FIG. 1b is a simplified optical schematic of the optical sight 10 shown in FIG. 1a. The illustrative optical sight 10 includes an objective lens 12 and an eyepiece 14 disposed within a housing 16. An imaging erecting prism (erector prism) 18 is provided between the objective lens 12 and the eyepiece 14 to shorten the optical path and to provide an image with proper right to left and up and down orientation when viewed through the eyepiece 14.

As shown in FIG. 1b, light 20 from a target scene is collected by the objective lens 12 and passes through a first surface 22 of the erector prism 18, which is normal to the optical axis. The light 20 reflects off a second surface 24 of the prism 18 back towards the first surface 22 at an angle such that it reflects off the first surface 22 towards a third surface 26 which, in the illustrative embodiment, is a roof.

Figure 1C:
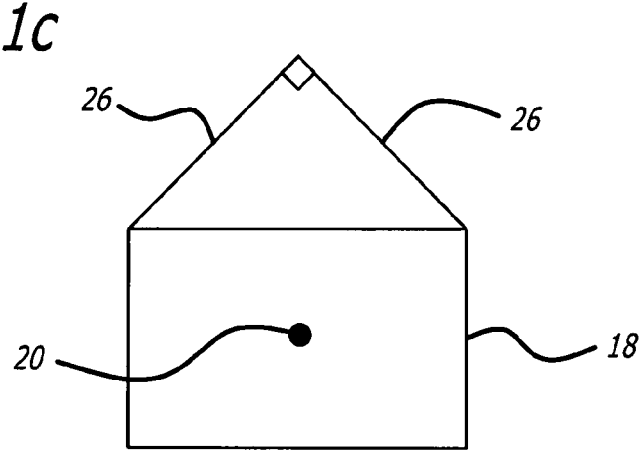
FIG. 1c is a frontal view of an erector prism used in an optical sight designed in accordance with an illustrative embodiment of the present teachings.

FIG. 1c is a frontal view of the erector prism 18, as viewed from the eyepiece, showing the roof 26. The light 20 is reflected off the roof 26 and strikes a fourth surface (the exit surface) 28 at an angle such that it reflects off the exit surface 28 towards a fifth surface (the reticle surface) 30. The light 20 then reflects off of the reticle surface 30, out through the exit surface 28 of the prism 18 and through the eyepiece 14 to the eye 32 of the observer.

A reticle 34 is etched onto the reticle surface 30 of the erector prism 18. In the illustrative embodiment, the reticle surface 30 is a mirrored surface having a reflective coating, and the reticle pattern 34 is formed on the reticle surface 30 by etching the pattern through the reflective coating. The reticle 34 is located at the focal point of both the objective lens 12 and the eyepiece 14. The observer 32 therefore sees the reticle pattern 34 superimposed over the target image.

Figure 2:
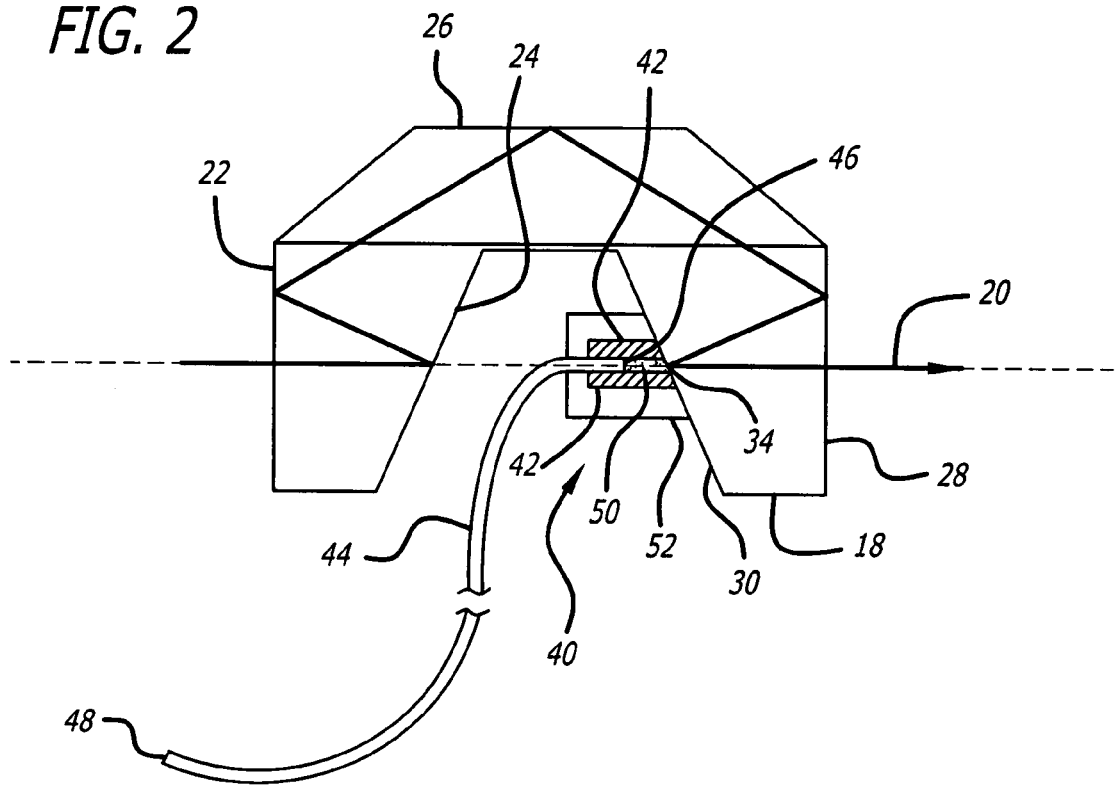
FIG. 2 is a simplified schematic of a reticle illumination system designed in accordance with an illustrative embodiment of the present invention, showing also the erector prism of the optical sight.

In accordance with the present teachings, a novel reticle illumination system 40 is placed behind the reticle 34. FIG. 2 is a simplified schematic of an illumination system 40 designed in accordance with an illustrative embodiment of the present invention, showing also the erector prism 18 of the optical sight 10. The illumination system 40 uses two or more different light sources. In the illustrative embodiment, the illumination system 40 includes an artificial light source 42 (such as tritium) suitable for night time operation, and a fluorescent fiber or light pipe 44 that uses ambient light (e.g., daylight) and is suitable for daytime operation.

The fluorescent fiber 44 is an optical fiber doped with a fluorescent dye that absorbs incident energy and re-emits energy at a specific wavelength. Ambient light passes through the surface of the fiber 44 and pumps the dye, causing it to fluoresce. The fluorescent light is then trapped within the fiber by total internal reflection, traveling through the length of the fiber 44 until it exits through a first fiber end surface 46. The opposite end 48 of the fiber 44 may be a reflective surface, reflecting the fluorescent light back towards the exit end 46. The exit end 46 of the fiber 44 is disposed within an illumination system housing 52, along with the tritium sources 42. The rest of the fiber 44 snakes outside of the sight housing 16 (as shown in FIG. 1a) such that ambient light will strike the length of the fiber 44. In an illustrative embodiment, the fiber 44 is 0.5 m long and may be wound up and positioned for maximum light absorption.

In accordance with the present teachings, the exit end 46 of the fiber 44 is placed at a predetermined distance away from the reticle surface 30 such that light exiting the fiber 44 illuminates the reticle 34. In a preferred embodiment, the gap between the fiber end 46 and the prism surface 30 is filled with a material 50 having an index of refraction matching that of the prism 18 to improve coupling. This gap is controlled to be fully illuminated and provides a scattering center site for the beta lights from the tritium sources 42. In a preferred embodiment, the gap material 50 is a high-viscosity fluid such as a glue or epoxy.

Figure 3A:
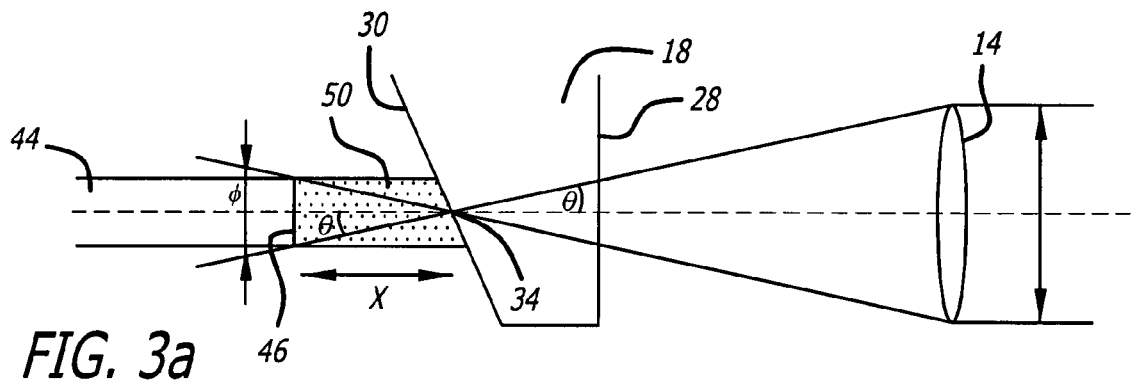
FIG. 3a is a more detailed schematic of part of the reticle illumination system designed in accordance with an illustrative embodiment of the present invention, showing the exit end of the fiber and the gap material.

FIG. 3a is a more detailed schematic of part of the reticle illumination system 40 designed in accordance with an illustrative embodiment of the present invention, showing the exit end 46 of the fiber 44 and the gap material 50. The exit pupil of the eyepiece 14 defines the angular extent that the fiber 44 should illuminate, and the angle θ depends on the refractive index of the gap material 50 (relative to the refractive index of the prism 18, which is typically made from glass). By using a gap material 50 having a refractive index matching that of the prism 18, light from the fiber 44 is not deviated, and will travel straight through the prism 18 along the optical axis towards the eye 32. This provides advantages in packaging and also provides a place to introduce other light sources (such as the tritium 42.

Figure 3B:
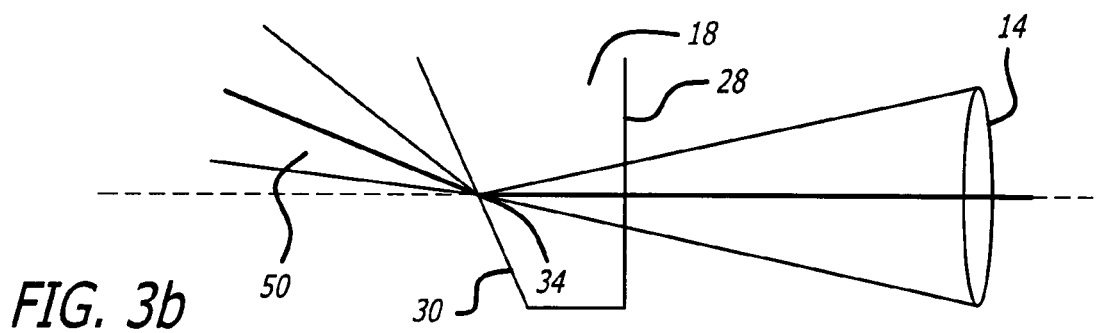
FIG. 3b is a schematic of part of the reticle illumination system designed in accordance with an illustrative embodiment of the present invention, showing the optical path if the material behind the reticle surface is not index-matched to the prism.

FIG. 3b is a schematic showing the optical path if the material 50 behind the reticle surface 30 is not index-matched to the prism 18. Because the reticle surface 30 is at an angle to the optical axis, light passing through the surface will be refracted if the material 50 does not have an index of refraction matching that of the prism 18. In this case, the fiber 44 should be angled (relative to the optical axis) such that light exiting the fiber 44 will travel along the optical path towards the eye in order to maximize illumination. This may present difficulties in packaging. Hence, in the preferred embodiment, the gap between the fiber 44 and the prism 18 is filled with a material having an index of refraction matching that of the prism 18, so that the fiber 44 can be placed parallel to the optical axis (as shown in FIG. 3a).

Returning to FIG. 3a, the diameter φ of the fiber 44 controls the distance x between the exit end 46 of the fiber 44 and the reticle surface 30 of the prism 18. The cone defined by the exit pupil (i.e., the region in which the eye will see the reticle 34) should be filled with light. As shown in FIG. 3a, the cone defined by the exit pupil can be formed by tracing rays from the outer boundaries of the exit pupil through the focal point of the eyepiece 14 (which is at the reticle surface 34). The fiber end 46 should therefore be positioned such that the fiber diameter φ is larger than or equal to this cone. In a preferred embodiment, the fiber end 46 is positioned at a distance x from the prism 18, such that the fiber diameter φ is equal to the cone defined by the exit pupil (as shown in FIG. 3a). This position maximizes illumination from the fiber 44, since more light from the fiber 44 is transmitted to the eyepiece 14. Since the fiber 44 is positioned at a distance away from the prism 18, this leaves an area that can be used by the tritium light sources 42.

Figure 4:
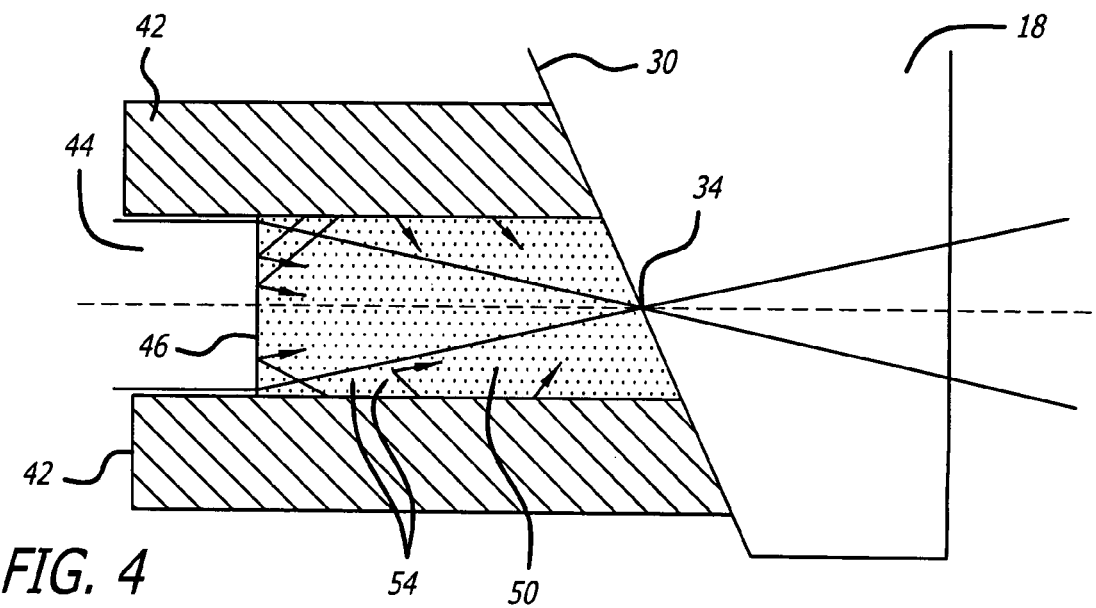
FIG. 4 is a schematic of part of the reticle illumination system designed in accordance with an illustrative embodiment of the present invention, showing the tritium sources.

FIG. 4 is a more detailed schematic of part of the reticle illumination system 40 designed in accordance with an illustrative embodiment of the present invention, showing the tritium sources 42. One or more tritium light sources 42 are placed in the area surrounding the gap (which is filled with the index-matching material 50) between the fiber 44 and the prism 18, such that light from the tritium sources 42 enters the gap material 50, strikes the exit surface 46 of the fiber 44, and is scattered back through the gap material 50 and prism 18 towards the eye. The exit surface 46 of the fiber 44 is reflective and diffuse, due to the index mismatch between the fiber 44 and the gap material 50 (which is index-matched to the prism 18). Some light from the tritium sources 42 will therefore scatter/reflect into the exit pupil and be observed by the eye.

The gap material 50 may also be designed to have scattering properties to increase illumination from the tritium sources 42. In an illustrative embodiment, the gap material 50 is doped with a plurality of scattering centers 54 (microscopic particles that cause incident light to change directions). Some of the light from the tritium sources 42 is reflected and scattered off of the scattering centers, towards the reticle 34. By adding scattering centers 54 to the gap material 50, illumination from the tritium 42 may be increased, although light from the fiber 44 may be decreased. The size and density of the scattering particles can be controlled to provide a desired balance between illumination from the fiber 44 and illumination from the tritium 42. In addition, some light from the tritium sources 42 may also pump the fiber 44.

In a preferred embodiment, the gap material 50 is a high-viscosity fluid to eliminate any air gaps between the material 50 and the prism 18 or the fiber 44, and to eliminate the need for a container for the fluid. In the best mode, the material is a glue or other epoxy formulated for gluing optical components. The glue can then be doped with scattering centers.

Thus, the teachings of the present invention provide a reticle illumination system suitable for both day and night operation. During daylight, the reticle is illuminated primarily from the fluorescent fiber, which collects ambient light and transmits it towards the reticle. During low ambient light conditions (e.g. at night), the dim beta light from the tritium sources can be seen. Neither the tritium sources nor the fiber need to be powered by a battery.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An optical system comprising:
an objective lens for receiving light from a target scene and forming a target image;
an eyepiece lens for outputting said target image;
an image erecting prism disposed between said objective and eyepiece lenses;
a reticle disposed on a reticle surface of said prism;
a fiber adapted to collect ambient light and output light toward said reticle, said fiber having an exit end located a predetermined distance away from said reticle surface;
a material having a predetermined index of refraction disposed between said exit end of said fiber and said reticle surface for coupling light from said fiber to said prism; and
an artificial light source adapted to generate artificial light that is transmitted into said material and reflected or scattered off of said exit end of said fiber towards said reticle.

2. The invention of claim 1 wherein said material is doped with a plurality of scattering centers for reflecting and scattering said artificial light.

3. The invention of claim 1 wherein said material has an index of refraction adapted to minimize refraction of light traveling from said fiber through said reticle surface.

4. The invention of claim 1 wherein said material has an index of refraction matching that of said prism.

5. The invention of claim 1 wherein said material is a high-viscosity fluid.

6. The invention of claim 1 wherein said material is a glue or epoxy.

7. The invention of claim 1 wherein said material is an epoxy formulated for gluing optical components.

8. The invention of claim 1 wherein said material fills a gap between said exit end of said fiber and said reticle surface such that there are no air gaps between said fiber, material, and reticle surface.

9. The invention of claim 1 wherein said exit end of said fiber is positioned at a distance away from said reticle surface such that a diameter of said fiber is larger than or equal to a cone defined by an exit pupil of said system.

10. The invention of claim 1 wherein said exit end of said fiber is reflective and/or diffuse such that light traveling from said material is reflected and scattered off of said exit end towards said reticle surface.

11. The invention of claim 1 wherein said fiber is doped with a fluorescent dye adapted to absorb said ambient light and re-emit fluorescent light.

12. The invention of claim 11 wherein said fluorescent light is output from said fiber towards said reticle surface.

13. The invention of claim 1 wherein said artificial light source is located next to said material.

14. The invention of claim 1 wherein said artificial light source includes a tritium light source.

15. A method for illuminating a reticle in an optical sight, said method including the steps of:
receiving light from a target scene and forming a target image using an objective lens;
outputting said target image through an eyepiece lens;
providing an image erecting prism disposed between said objective and eyepiece lenses;
providing a reticle on a surface of said prism such that a reticle pattern is superimposed over said target image;
collecting ambient light and converting said ambient light to fluorescent light using an optical fiber;
outputting fluorescent light through an exit end of said fiber to illuminate said reticle;
positioning said exit end of said fiber a predetermined distance away from said prism to maximize illumination of said reticle from said fiber;
filling a gap between said exit end of said fiber and said prism with a material having an index of refraction suitable for coupling light from said fiber to said prism; and
positioning an artificial light source next to said material such that light from said artificial light source is transmitted into said material and reflected off of said exit end of said fiber towards said reticle.

16. The invention of claim 15 wherein said material has an index of refraction matching that of said prism.

17. The invention of claim 15 wherein said method further includes doping said material with a plurality of scattering centers adapted to reflect and scatter said artificial light.

* * * * *